United States Patent
Yang et al.

(10) Patent No.: US 10,489,910 B2
(45) Date of Patent: Nov. 26, 2019

(54) MEDICAL IMAGE PROCESSING APPARATUS, MEDICAL IMAGE PROCESSING METHOD AND MEDICAL IMAGE DEVICE

(71) Applicant: Toshiba Medical Systems Corporation, Otawara-shi (JP)

(72) Inventors: Hong Yang, Beijing (CN); Yanhua Wang, Beijing (CN); Minfeng Xu, Beijing (CN); Bing Han, Beijing (CN)

(73) Assignee: Canon Medical Systems Corporation, Otawara-shi (JP)

( * ) Notice: Subject to any disclaimer, the term of this patent is extended or adjusted under 35 U.S.C. 154(b) by 0 days.

(21) Appl. No.: 15/660,791

(22) Filed: Jul. 26, 2017

(65) Prior Publication Data

US 2017/0337688 A1 Nov. 23, 2017

Related U.S. Application Data

(62) Division of application No. 14/717,354, filed on May 20, 2015, now Pat. No. 9,779,510.

(30) Foreign Application Priority Data

Aug. 26, 2014 (CN) .......................... 2014 1 0426011

(51) Int. Cl.
 *G06T 7/246* (2017.01)
 *G06T 7/00* (2017.01)
(52) U.S. Cl.
 CPC ............ *G06T 7/0016* (2013.01); *G06T 7/246* (2017.01); *G06T 7/248* (2017.01); *G06T 2207/30048* (2013.01)

(58) Field of Classification Search
 CPC combination set(s) only.
 See application file for complete search history.

(56) References Cited

U.S. PATENT DOCUMENTS 5,273,040 A * 12/1993 Apicella .............. A61B 5/0263
                                                                382/130
5,800,356 A    9/1998 Criton
(Continued)

FOREIGN PATENT DOCUMENTS

CN        101564306 A      10/2009
CN        103584888 A       2/2014
(Continued)

OTHER PUBLICATIONS

Japanese Office Action dated Feb. 28, 2019 in Japanese Patent Application No. 2015-096040, 6 pages.

*Primary Examiner* — Tsung Yin Tsai
(74) *Attorney, Agent, or Firm* — Oblon, McClelland, Maier & Neustadt, L.L.P.

(57) ABSTRACT

A medical image processing apparatus according to an embodiment includes an estimation circuitry and a tracking circuitry. The estimation circuitry is configured to estimate the activity of the myocardium across a plurality of images at different time phases from a group of images where a plurality of images containing a myocardium are chronologically arranged. The tracking circuitry is configured to set a search range for tracking the myocardium in the group according to the activity of the myocardium and perform the tracking.

5 Claims, 12 Drawing Sheets

(56) References Cited

U.S. PATENT DOCUMENTS

| | | | | |
|---|---|---|---|---|
| 6,137,913 | A * | 10/2000 | Kwak | G06T 7/12 382/173 |
| 6,236,738 | B1 * | 5/2001 | Zhu | G06T 7/215 382/107 |
| 6,892,089 | B1 * | 5/2005 | Prince | A61B 5/055 128/922 |
| 7,079,674 | B2 | 7/2006 | Paragios et al. | |
| 8,280,136 | B2 | 10/2012 | Gotardo | |
| 8,480,582 | B2 | 7/2013 | Tsujino | |
| 9,779,510 | B2 * | 10/2017 | Yang | G06T 7/0016 |
| 9,865,048 | B2 * | 1/2018 | Wakai | G06T 7/0012 |
| 2003/0052883 | A1 | 3/2003 | Paragyios et al. | |
| 2004/0208341 | A1 | 10/2004 | Zhou | |
| 2008/0317316 | A1 * | 12/2008 | Ohuchi | A61B 8/08 382/131 |
| 2009/0010505 | A1 * | 1/2009 | Cocosco | G06T 7/0012 382/128 |
| 2009/0010511 | A1 * | 1/2009 | Gardner | A61B 5/7207 382/128 |
| 2009/0060306 | A1 | 3/2009 | Ohuchi | |
| 2009/0214098 | A1 * | 8/2009 | Hornegger | A61B 6/032 382/131 |
| 2009/0270732 | A1 * | 10/2009 | Abe | A61B 8/0883 600/443 |
| 2009/0318803 | A1 * | 12/2009 | Abe | A61B 8/08 600/438 |
| 2010/0195887 | A1 * | 8/2010 | Abe | A61B 8/08 382/131 |
| 2010/0198072 | A1 * | 8/2010 | Abe | A61B 8/08 600/443 |
| 2011/0144967 | A1 * | 6/2011 | Adirovich | G16H 40/63 703/11 |
| 2013/0182935 | A1 | 7/2013 | Wang | |
| 2014/0161339 | A1 * | 6/2014 | Wakai | G06T 7/0012 382/131 |
| 2016/0063702 | A1 * | 3/2016 | Yang | G06T 7/0016 382/103 |

FOREIGN PATENT DOCUMENTS

| | | |
|---|---|---|
| JP | 7-320068 A | 12/1995 |
| JP | 2002-541963 A | 12/2002 |
| JP | 2004-529713 A | 9/2004 |
| JP | 2004-351050 A | 12/2004 |
| JP | 2012-110689 A | 6/2012 |

* cited by examiner

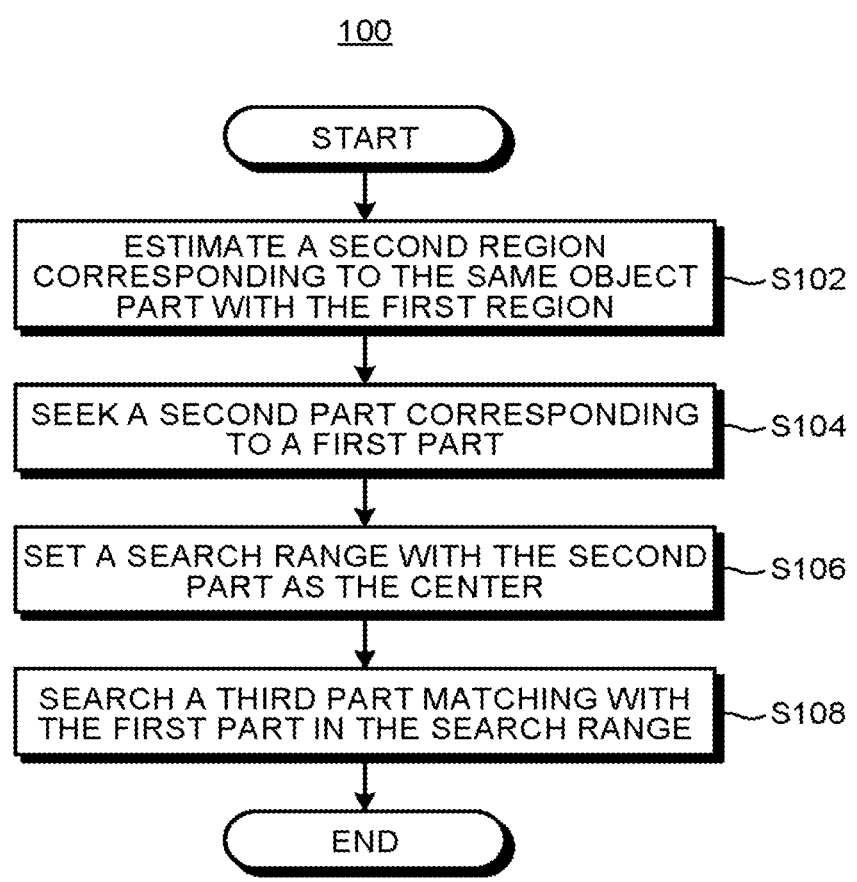

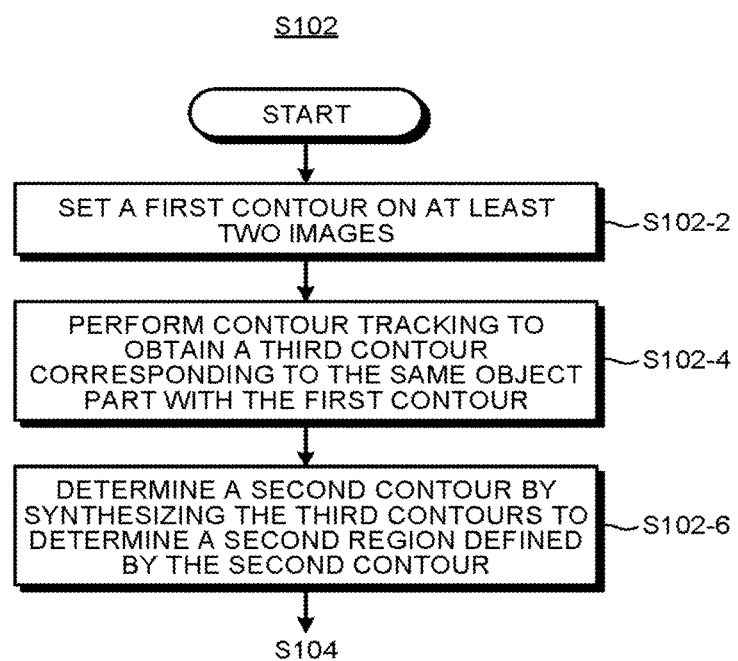
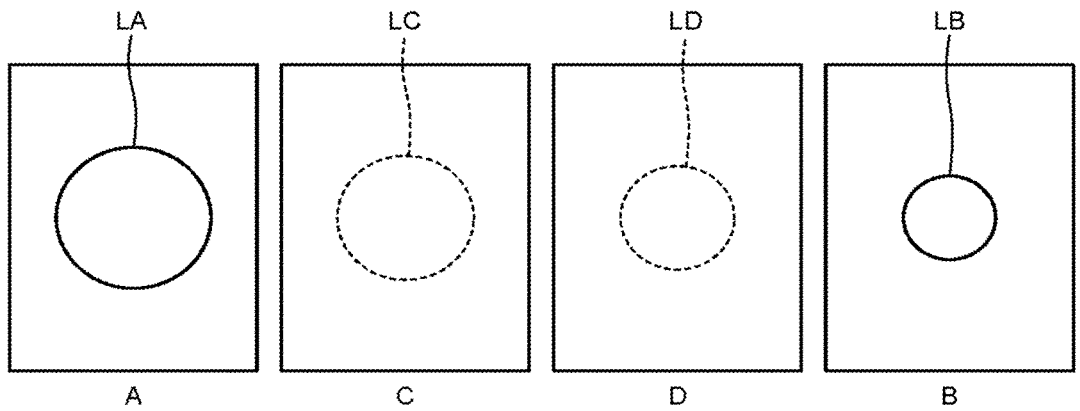

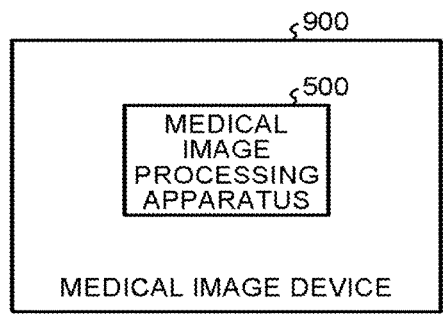
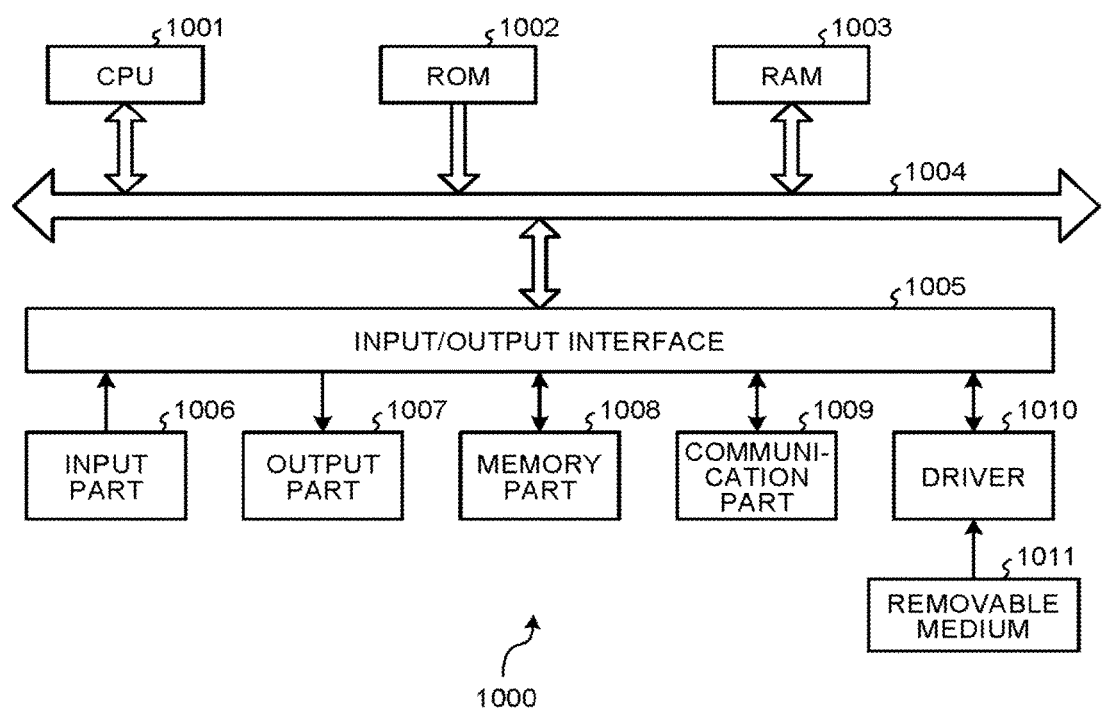

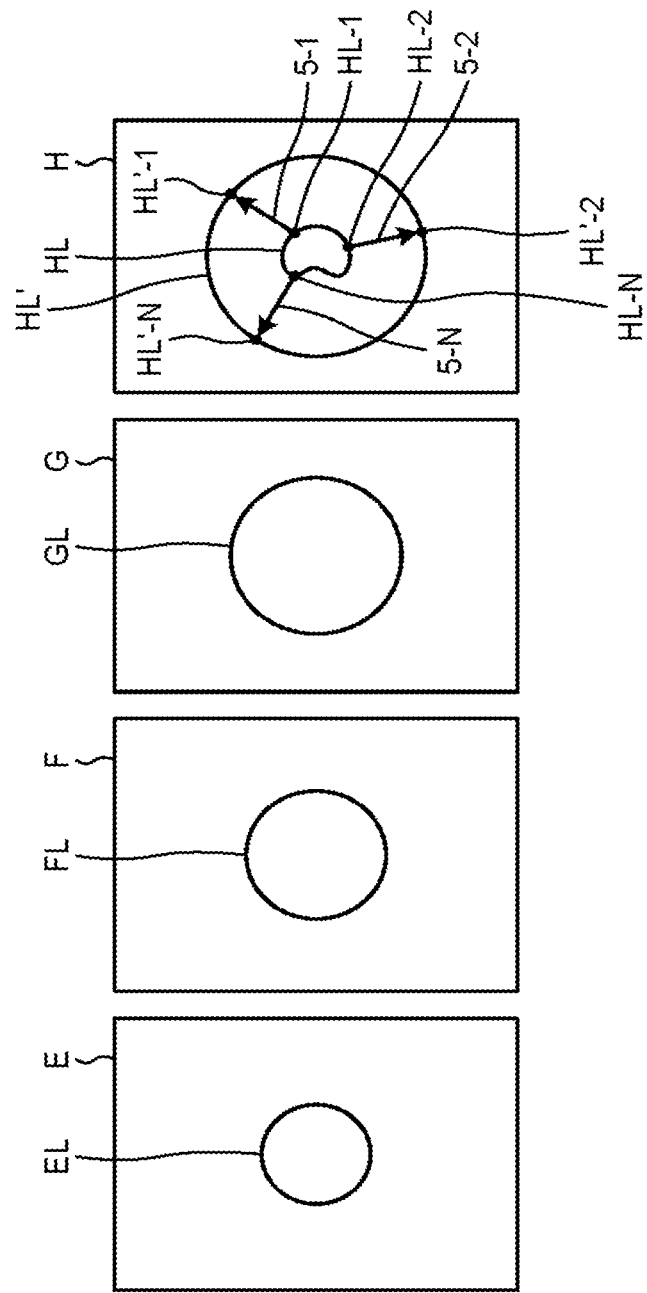

MEDICAL IMAGE PROCESSING APPARATUS, MEDICAL IMAGE PROCESSING METHOD AND MEDICAL IMAGE DEVICE

CROSS-REFERENCE TO RELATED APPLICATIONS

This application is a divisional application of U.S. application Ser. No. 14/717,354, filed May 20, 2015, which is based upon and claims the benefit of priority from Chinese Patent Application No. 201410426011.6, filed on Aug. 26, 2014, the entire contents of which are incorporated herein by reference.

FIELD

Embodiments relate to medical image processing apparatus, medical image processing method and medical image device.

BACKGROUND

When image tracking is performed on an image sequence which includes a series of images captured from the same object during the expansion, contraction or another movement period of the object, sometimes, template matching is used to perform a two-dimensional movement tracking. By performing template matching on each part in a region of interest across images, the movement of the region of interest can be tracked. Occasionally, due to the high-speed of the object, when template matching is performed on a specific image with a part of a former image as a template, it is difficult to find, within a search range, a part of the specific image matching with the part in the former image.

Thus, a technology is desired which is capable of addressing the problem above.

BRIEF DESCRIPTION OF THE DRAWINGS

The foregoing and other objects, features and advantages will be more readily understood with reference to the description of embodiments when read in conjunction with the accompanying drawings in which components are merely illustrative of the principle of embodiments and identical or like reference signs designate identical or like technical features or components.

FIG. 1 is a flowchart showing a medical image processing method according to an embodiment;

FIG. 2A is a flowchart showing another example of the second region estimation step of the medical image processing method shown in FIG. 1;

FIG. 2B is a schematic diagram exemplarily showing an image sequence;

FIG. 9 is a block diagram showing an exemplary configuration of a medical image device according to an embodiment;

FIG. 10 is a structural diagram exemplifying the structure of a computing device for realizing the medical image processing method and the medical image processing apparatus;

FIG. 15C is a diagram to explain an example of the processing by executed the medical image processing apparatus shown in FIG. 13.

DETAILED DESCRIPTION

Figure 2C:
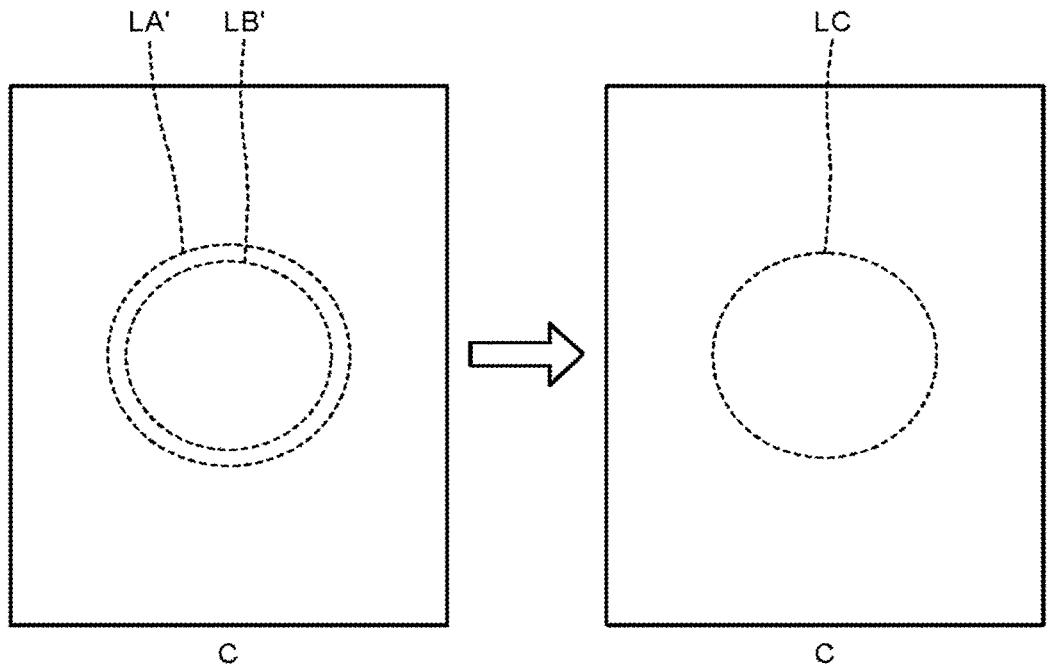
FIG. 2C is a schematic diagram showing a second region determination process.

A medical image processing apparatus according to an embodiment includes an estimation circuitry and a tracking circuitry. The estimation circuitry is configured to estimate the activity of the myocardium across a plurality of images at different time phases from a group of images where a plurality of images containing a myocardium are chronologically arranged. The tracking circuitry is configured to set a search range for tracking the myocardium in the group according to the activity of the myocardium and perform the tracking.

The following presents a simplified summary of embodiments to provide a basic understanding of some aspects of embodiments. It should be appreciated that the summary, which is not an exhaustive overview of embodiments, is not intended to identify the key or critical parts of embodiments or limit the scope of embodiments, but merely to present some concepts in a simplified form as a prelude to the more detailed description that is discussed later.

It is a main object of embodiments to provide a medical image processing apparatus, a medical image processing method and a medical image device.

In accordance with an embodiment, a medical image processing apparatus is provided which includes an estimation unit and a tracking unit. The estimation unit estimates the activity of the myocardium across a plurality of images at different time phases from a group of images where a plurality of images containing a myocardium are chronologically arranged. The tracking unit sets a search range for tracking the myocardium in the group according to the activity of the myocardium and performs the tracking.

In accordance with another embodiment, a medical image processing method is provided which includes a step of estimating the activity of the myocardium across a plurality of images at different time phases from a group of images where a plurality of images containing a myocardium are chronologically arranged. The method further includes a step of setting a search range for tracking the myocardium in the group according to the activity of the myocardium and performing the tracking.

In accordance with still another embodiment, a medical image device is provided which includes the foregoing medical image processing apparatus.

Furthermore, in accordance with yet still another embodiment, a computer program is provided to realize the aforementioned method.

Additionally, in accordance with still further embodiment, a computer program product is provided which is in the form of a medium at least readable to a computer and on which computer program codes for realizing the aforementioned method are recorded.

These and other advantages of embodiments will be more apparent from the following detailed description of preferred embodiments when read in conjunction with accompanying drawings.

Embodiments are described below with reference to accompanying drawings. The elements and features described in an accompanying drawings or implementation mode may be combined with those shown in one or more other accompanying drawings or implementation modes. It should be noted that for the sake of clarity, representation and description of the components and processing that are unrelated to embodiments but well known to those of ordinary skill in the art are omitted in accompanying drawings and description.

Figure 12:
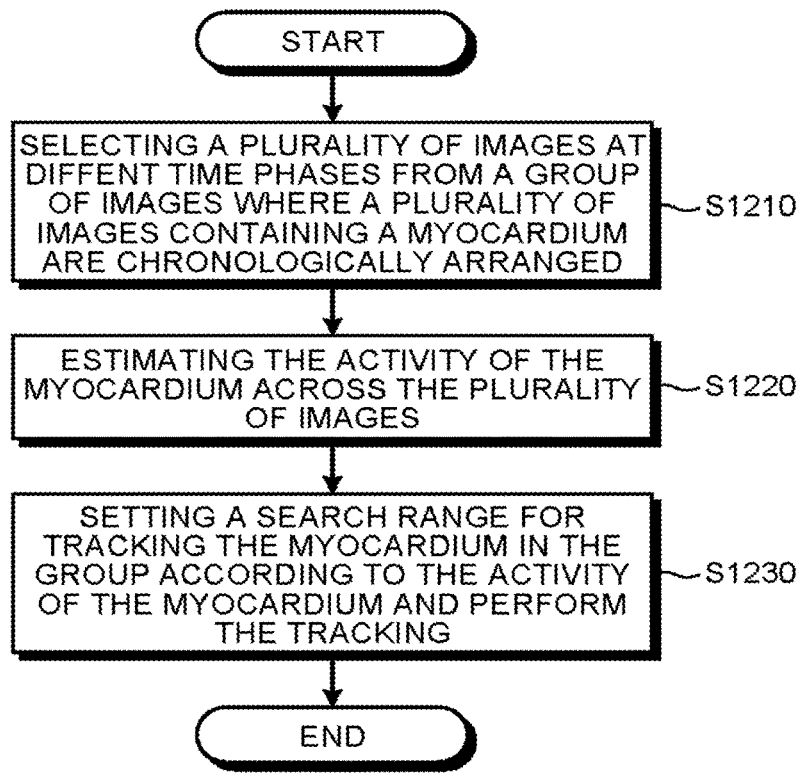
FIG. 12 is a flowchart exemplarily showing the process of a medical image processing method according to an embodiment.

FIG. 12 is a flowchart exemplarily showing the process of a medical image processing method according to an embodiment.

In Step S1210, a plurality of images at different time phases are selected from an image group including a plurality of chronologically arranged images of a myocardium. The image group includes, for example, a series of images captured from the same myocardium during the movement period of the myocardium. Additionally, the images may be selected from the image group according to a preset rule. For example, a plurality of images may be selected from an image sequence at preset intervals, etc.

Next, in Step S1220, the activity of the myocardium across the plurality of selected images is estimated.

Sequentially, in Step S1230, a search range for the tracking of the myocardium in the image group is set according to the activity of the myocardium and a tracking is performed.

An exemplary way of estimating the activity of an object and tracking the object is showed below with reference to specific embodiments, however, it should be appreciated by those skilled in the art that embodiments are not limited to this and other ways that are known in the art are also applicable to estimating and tracking the activity of an object.

FIG. 1 is a flowchart showing a medical image processing method 100 according to an embodiment. In the method, Step S102 is corresponding to Step S1220 described with reference to FIG. 12, and Steps S104-S108 are corresponding to Step S1230 described with reference to FIG. 12.

As shown in FIG. 1, in Step S102, a second region which corresponds to the same object part with a first region set on at least one image (e.g. one, two or more images) in an image sequence is estimated on the other images of the image sequence according to the first region.

Here, the object may be any moving object. In an example, the image sequence refers to medical images formed according to the data acquired by a medical diagnostic device. The object may be, for example, a heart, a lung, an artery or another locomotive organ. For example, the object is the same part of a heart.

For example, the set first region may be a region corresponding to an object part of interest. As the image sequence is a series of images captured from the same object during the movement period of the object, a region corresponding to the object part of interest is also contained in the other images of the image sequence, as a result, a second region corresponding to the object part of interest can be estimated according to the set first region.

Here, the first region may be set manually or automatically according to the feature of the object.

Next, in Step S104, a second part corresponding to the same object part with a first part in the first region is searched in the second region.

Figure 2D:
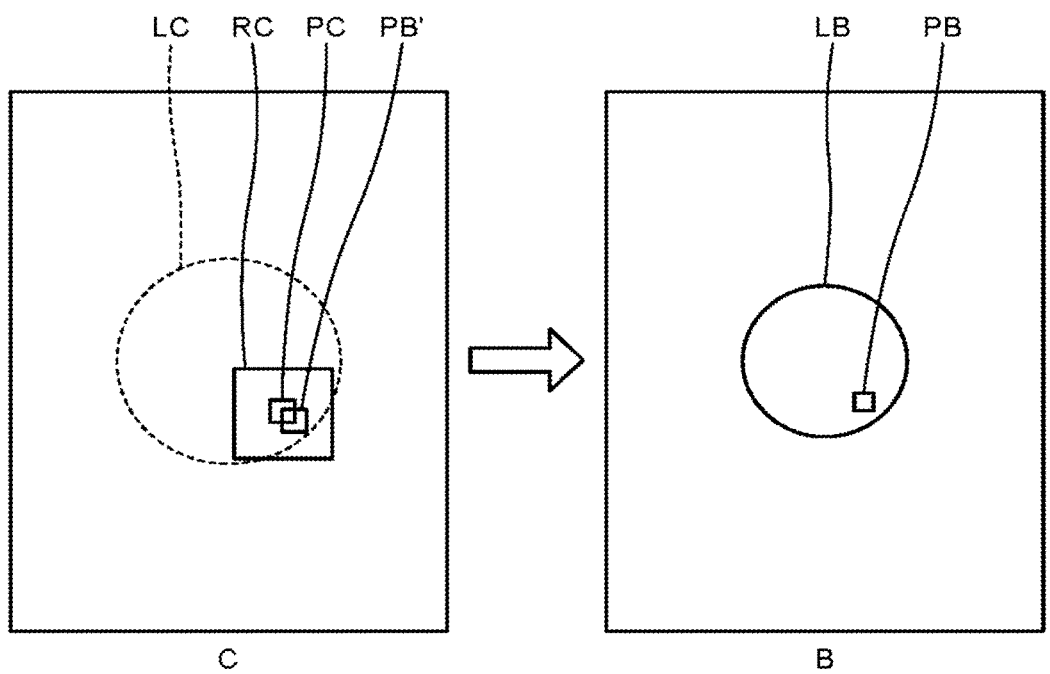
FIG. 2D is a schematic diagram showing an image tracking process carried out between two images.

FIG. 2D is a schematic diagram showing an image tracking process carried out between two images.

The first region may be divided into a plurality of parts (referred to as a first part) of a predetermined size at predetermined intervals. Then, according to the position relationship between each divided part and specific points on the edge (also called contour) of the first region, a part (also referred to as a second part) having the same position relationship with corresponding points on the edge of the second region is searched in the second region. For example, assuming that there are 100 points on the edge of the first region and there are 100 points on the edge of the second region which correspond to the 100 points on the edge of the first region, the point nearest to a first part is searched on the edge of the first region, and assuming that the point is the 55th point, then the position relationship between the first part and the 55th point is obtained, and then, a part having the same position relationship with the 55th point on the edge of the second region is searched in the second region, that is, the second part is obtained.

In FIG. 2D, the first region is the region defined by the contour LB, and the second region is the region defined by the contour LC. The two-dimensional arrangement rule may be, for example, equipartition. Then, a second part PC corresponding to a certain first part PB in the first region may be searched in the second region according to the two-dimensional arrangement rule, that is, a second part PC corresponding to the same object part with the first part PB is searched.

Next, in Step S106, a search range is set in the other images in the image sequence with the second part as the center.

The set search range may be, for example, a circle, an oval or a square which takes the second part as the center, as needed. The search range is used for the following template matching. A square search range RC taking the second part PC as the center is set in the example shown in FIG. 2D.

Sequentially, in Step S108, a third part matching with the first part is searched in the set search range in the other images of the image sequence to perform image tracking.

In the example shown in FIG. 2D, a third part PB' matching with the first part PB is searched in the search range RC.

In an example, template matching may be implemented in the set search range with the first part as a template to determine a third part matching with the first part. Template matching is one of the methods for searching for a target in an image. The working mode of template matching lies in matching an image with another image by sliding an image block on the image.

By estimating the second region, searching for the second part corresponding to the first part and setting a search range with the second part as the center, the third part matching with the first part can be determined more accurately and more quickly in the search range. Therefore, the tracking of the myocardium can be implemented accurately and quickly.

Taking the left ventricle of a heart as an example, the left ventricle moves vigorously within a certain period of a cardiac cycle. It is sometimes difficult to perform template matching in the original search range using existing technologies because the myocardium of the left ventricle contracts or expands at a so high speed that the concerned parts may move out of the original search range. Thus, by updating the search range, template matching can be implemented more accurately and more quickly in the updated search range. Therefore, the tracking of the myocardium can be implemented accurately and quickly.

FIG. 2A is a flowchart showing an example of the second region estimation step S102 of the medical image processing method shown in FIG. 1. FIG. 2B is a schematic diagram exemplarily showing an image sequence, in which a setting of a first contour is made on two images in the image sequence according to the feature of an object to limit a first region. FIG. 2C is a schematic diagram showing a second region determination process.

As shown in FIG. 2A, in Step S102-2, a first contour for defining a first region is separately set on at least two images in the image sequence according to the feature of an object.

FIG. 2B is a schematic diagram exemplarily showing an image sequence, in which a setting is made on two images in the image sequence according to the feature of an object to limit a first region;

As shown in FIG. 2B, the image sequence includes images A-D, a first contour LA for defining a first region is set on the image A in the image sequence, and a first contour LB for defining a first region is set on the image B in the image sequence. Here, for example, a direction from the image A to the image D is a chronological direction, and a direction from the image D to image A is a direction which is reverse to the chronological direction.

In addition, the feature of the object may be, for example, the shape, color, grayscale or the like of the object. A region which corresponds to an object part of interest and the edge of which is the first contour can be determined according to the feature of the object.

Sequentially, in Step S102-4, contour tracking is performed on the other images of the image sequence with respect to the set first contour so as to obtain, on the other images, a third contour corresponding to the same object part with the first contour.

In the example shown in FIG. 2C, contour tracking may be performed on the image C with respect to the first contour LA set on the image A so as to obtain a third contour LA' corresponding to the same object part with the first contour LA. That is, contour tracking may be performed with respect to the first contour LA in the chronological direction so as to obtain the third contour LA'. And contour tracking is performed on the image C with respect to the first contour LB set on the image B so as to obtain a third contour LB' corresponding to the same object part with the first contour LB. That is, contour tracking may be performed with respect to the first contour LB in the direction which is reverse to the chronological direction so as to obtain the third contour LB'. In this way, the third contours LA' and LB' are obtained on the image C. Although not shown, it can be appreciated that the similar processing can be performed on the image D.

Next, in Step S102-6, a second contour is determined by synthesizing the third contours on the other images to determine a second region defined by the second contour.

In the example shown in FIG. 2C, a second contour LC is determined by synthesizing the third contours LA' and LB' on the image C to determine a second region defined by the second contour LC.

Here, synthesizing refers to, for example, averaging a plurality of third contours on each of the other images to obtain a second contour.

Preferably, the second contour is determined by carrying out weighted average for the plurality of third counters on each of the other images according to image sequence distances between the image and the at least two images. Here, for example, the image sequence distance refers to difference of a time between a timing when the other image is imaged and a timing when the at least two images are imaged. For example, as to the image sequence distance, the image sequence distance between two adjacent images may be 1, that between two images spaced by an image is 2, and that between two images spaced by two images is 3, and so on and so forth. The shorter the image sequence distance is, the higher the weight of a corresponding third contour is.

In the example shown in FIG. 2C, if the image sequence distance between the image C and the image A is 1 and that between the image C and the image B is 2, then the weight of the third contour LA' is greater than that of the third contour LB' in the image C. In other words, as the image sequence distance between the image C and the image A is shorter than that between the image C and the image B, the third contour LA' obtained in the image C according to the first contour LA set in the image A is more accurate than the third contour LB' obtained in the image C according to the first contour LB set in the image B, thus, the third contour LA' is endowed with a greater weight.

An example of the determination of a plurality of third contours in each of the other images according to a plurality of first contours and the obtaining of a second contour by synthesizing the plurality of third contours is described above with reference to FIG. 2A-FIG. 2C, however, in some cases, for example, an object part of interest has extremely similar shape, color or grayscale or another feature in each image. A third contour is enough to determine a second contour, that is, the third contour is the finally determined second contour. This situation is described below with reference to FIG. 3. Here, the first contour, the second contour and the third contour are contour which is provisionally set. On the other hand, by performing the tracking in the step S1230 shown in foregoing FIG. 12, a conclusive contour which is used for the evaluation of the myocardium is obtained. Thus, the first contour, the second contour and the third contour are not the contour which is used for the evaluation of the myocardium, but are merely a candidate of the contour. So the first contour is called "a first contour candidate," the second contour is called "a second contour candidate" and the third contour is called "a third contour candidate."

Figure 3:
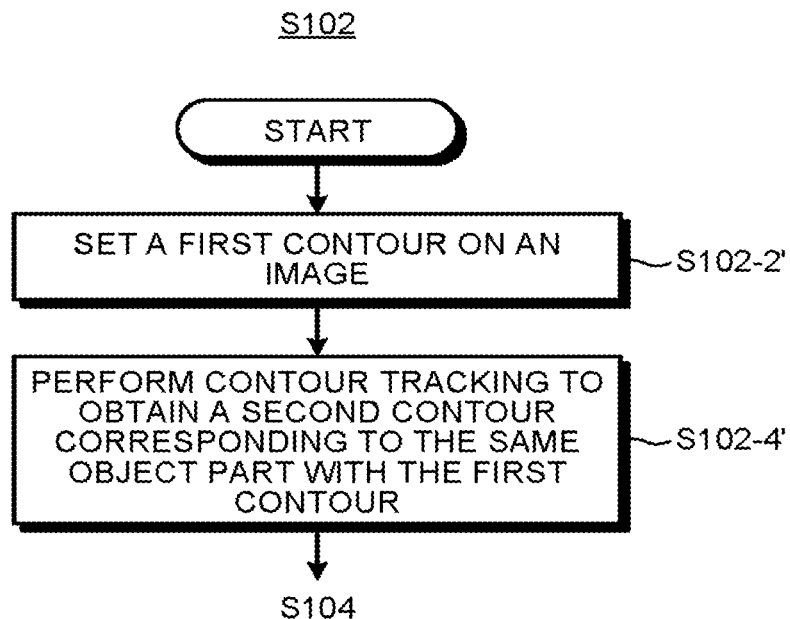
FIG. 3 is a flowchart showing another example of the second region estimation step S102 of the medical image processing method shown in FIG. 1.

FIG. 3 is a flowchart showing another example of the second region estimation step S102 of the medical image processing method shown in FIG. 1.

As shown in FIG. 3, in Step S102-2', a first contour for defining a first region is set on an image in the image sequence according to the feature of an object.

As stated above, the feature of the object may be, for example, the shape, color, grayscale or the like of the object. A region which is corresponding to an object part of interest and the edge which is the first contour can be determined according to the feature of the object.

Sequentially, in Step S102-4', contour tracking is performed on the other images of the image sequence with respect to the set first contour to obtain a second contour to determine a second region defined by a second contour. In other words, the second contour is a result directly obtained from the contour tracking.

A process of directly or indirectly obtaining a second contour through contour tracking and consequentially obtaining a second region defined by the second contour is described above with reference to FIG. 2A-FIG. 2C and FIG. 3, that is, a process of estimating a second region through contour tracking is described. According to an embodiment, the second region may also be estimated in another way. An example of another way for estimating the second region is described below with reference to FIG. 4.

Figure 4:
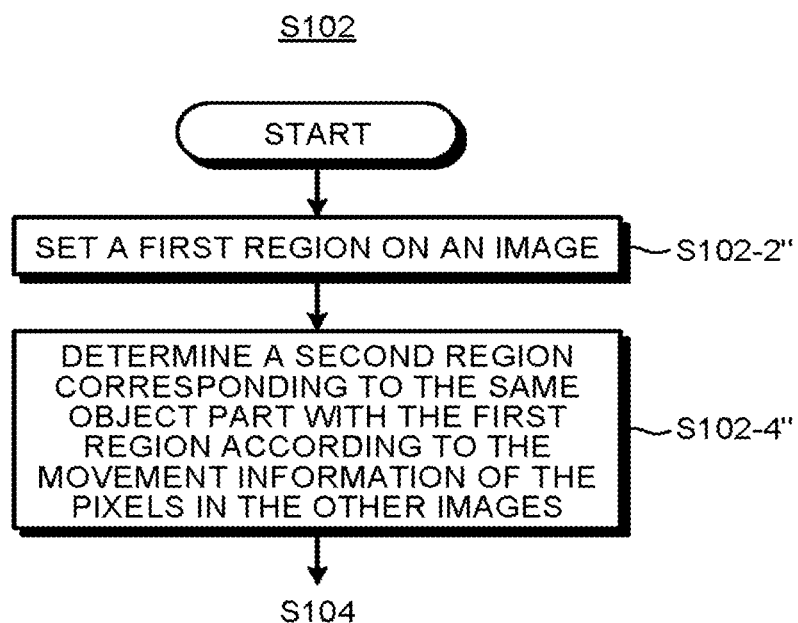
FIG. 4 is a flowchart showing still another example of the second region estimation step of the medical image processing method shown in FIG. 1.

FIG. 4 is a flowchart showing still another example of the second region estimation step S102 of the medical image processing method shown in FIG. 1.

As shown in FIG. 4, in Step S102-2", a first region is set on an image in an image sequence according to the feature of an object.

Here, the feature of the object may be, for example, the shape, color, grayscale or the like of the object. A region corresponding to the object part of interest can be determined according to the feature of the object.

Next, in Step 102-4", a second region corresponding to the same object part with the first region is determined in the other images in the image sequence according to the movement information of the pixels in the other images in the image sequence.

For example, image registration may be performed on the other images in the image sequence and the image in which the first region is set, thereby obtaining the movement information of the pixels in the other images.

Specifically, image registration is performed on all the images of the image sequence one by one. Then, the movement information of the pixels in each image is estimated based on the image registration. Last, a corresponding second region in each image is obtained with reference to the movement information of the pixels nearby the first region.

A medical image processing method is described above with reference to FIG. 12 and FIG. 1-FIG. 4. A medical image processing apparatus is outlined below with reference to FIG. 11 and FIG. 5-FIG. 8 without repeatedly discussing the details that are discussed above.

Figure 11:
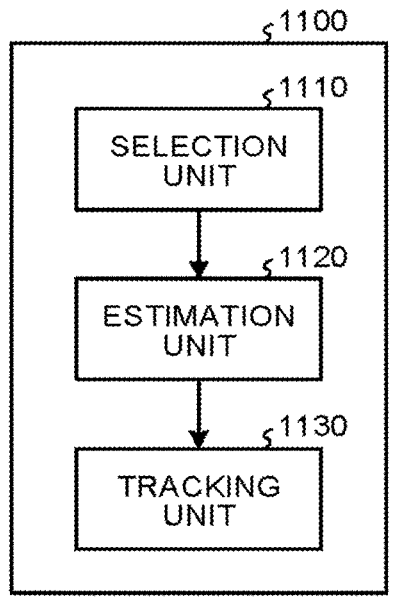
FIG. 11 is a block diagram exemplarily showing the configuration of a medical image processing apparatus according to an embodiment.

FIG. 11 is a block diagram exemplarily showing the configuration of a medical image processing apparatus 1100 according to an embodiment.

The medical image processing apparatus 1100 includes a selection unit 1110, an estimation unit 1120 and a tracking unit 1130.

The selection unit 1110 selects a plurality of images at different time phases from an image group including a plurality of chronologically arranged images of a myocardium.

The estimation unit 1120 estimates the activity of the myocardium across the plurality of images.

The tracking unit 1130 sets a search range for the tracking of the myocardium in the image group according to the activity of the myocardium and performs a tracking.

Figure 5:
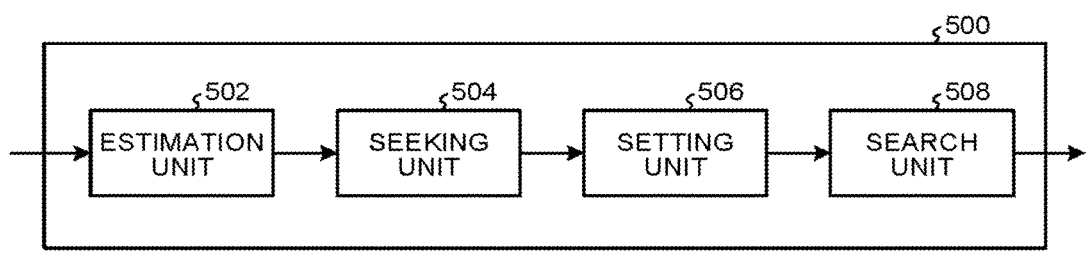
FIG. 5 is a block diagram showing a medical image processing apparatus according to an embodiment.

FIG. 5 is a block diagram showing a medical image processing apparatus 500 according to an embodiment.

As shown in FIG. 5, the medical image processing apparatus 500 includes an estimation unit 502, a seeking unit 504, a setting unit 506 and a search unit 508. The estimation unit 502 corresponds to the estimation unit 1120 described with reference to FIG. 11, and the seeking unit 504, the setting unit 506 and the search unit 508 correspond to the tracking unit 1130 described with reference to FIG. 11.

The estimation unit 502 is configured to estimate, according to a first region set on at least one image in an image sequence, a second region corresponding to the same object part with the first region on the other images in the image sequence, wherein the image sequence includes a series of images captured from the same object during the movement period of the same object.

The seeking unit 504 is configured to seek, in the second region estimated by the estimation unit 502, a second part corresponding to the same object part with a first part in the first region.

The setting unit 506 is configured to set a search range in the other images the second part sought by the seeking unit 504 as the center.

The search unit 508 is configured to search a third part matching with the first part in the search range set by the setting unit 506 to perform image tracking.

Preferably, the search unit 508 is configured to perform template matching in the search range set by the setting unit 506 with the first part as a template so as to determine a third part matching with the first part.

For example, the set first region may be a region corresponding to an object part of interest. As the image sequence is a series of images captured from the same object during the movement period of the object, there is also a region corresponding to the object part of interest in the other images of the image sequence, therefore, the second region corresponding to the object part of interest can be estimated according to the set first region Here, the object may be any moving object. In the medical field, the object may be, for example, a heart, a lung, an artery or another locomotive organ. For example, the object is the same part of a heart. In an example, the image sequence is medical images formed according to the data acquired by a medical diagnostic device, that is, the image sequence includes the medical image.

Figure 6:
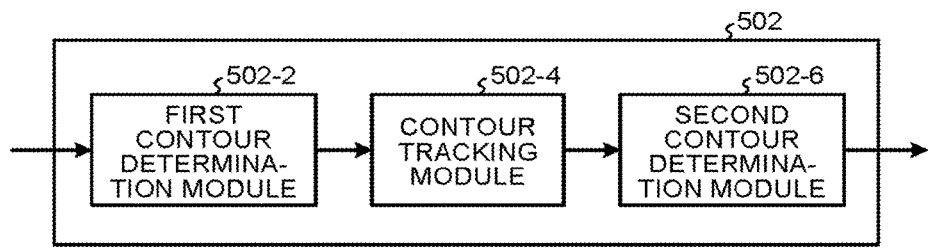
FIG. 6 is a block diagram showing an example of the estimation unit of the medical image processing apparatus shown in FIG. 5.

FIG. 6 is a block diagram showing an example of the estimation unit 502 of the medical image processing apparatus 500 shown in FIG. 5.

As shown in FIG. 6, the estimation unit 502 may include a first contour determination module 502-2, a contour tracking module 502-4 and a second contour determination module 502-6.

The first contour determination module 502-2 may be configured to set a first contour for defining a first region on at least two images in the image sequence according to the feature of an object.

The contour tracking module 502-4 may be configured to perform contour tracking on the other images with respect to the first contour set by the first contour determination module 502-2 to obtain, on the other images, a third contour corresponding to the same object part with the first contour.

The second contour determination module 502-6 may be configured to determine a second contour by synthesizing the third contours obtained by the contour tracking module 502-4 on the other images to determine a second region defined by the second contour. In an example, the second contour determination module 502-6 may be configured to carry out weighted average for the third contours according to the image sequence distances between the other images and the at least two images to determine the second contour.

An example of the determination of a plurality of third contours in each of the other images according to a plurality of first contours and the obtaining of a second contour by synthesizing the plurality of third contours is described above with reference to FIG. 6. An example that a type of the first contour is one type is described above. However, the types of the first contour may be a plurality of types. For example, the types of the first contour may be two types. One is a contour of endocardium, and the other is a contour of epicardium. An initial contour of endocardium and an initial contour of epicardium may be set on the image at a systolic phase. Further a contour candidate of endocardium and a contour candidate of epicardium may be set on the image at a diastolic phase. That is, the first contour candidates of the plurality of types may be set on an image at a same time phase. In this case, the contour tracking may be performed on the other image with respect to each type of the first contour candidates so as to obtain the third contour candidate corresponding to the same object part with the each type of the first contour candidate. Also, in some cases, for example, an object part of interest has extremely similar shape, color or grayscale or another feature in each image. A third contour is enough to determine a second contour, that is, the third contour is the finally determined second contour. This situation is also described below with reference to FIG. 6, and in these cases, the second contour determination module 502-6 can be omitted.

The first contour determination module 502-2 may be configured to set a first contour for defining a first region on an image in the image sequence according to the feature of the object.

The contour tracking module 502-4 may be configured to perform contour tracking on the other images with respect to the first contour set by the first contour determination module 502-2 to obtain a second contour to determine a second region defined by the second contour. In other words, the third contour is deemed as the finally determined second contour.

Figure 7:
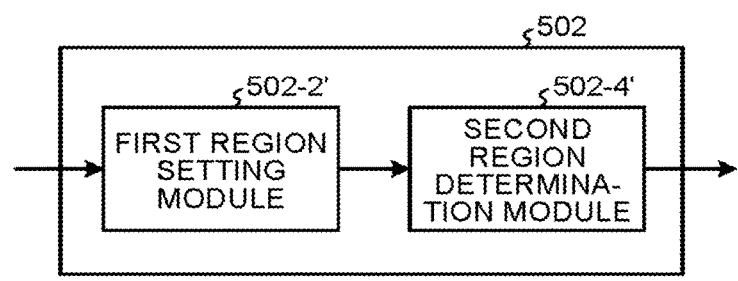
FIG. 7 is a block diagram showing another example of the estimation unit of the medical image processing apparatus shown in FIG. 5.

FIG. 7 is a block diagram showing another example of the estimation unit 502 of the medical image processing apparatus 500 shown in FIG. 5.

As shown in FIG. 7, the estimation unit 502 may include a first region setting module 502-2' and a second region determination module 502-4'.

The first region setting module 502-2' may be configured to set a first region on an image in the image sequence according to the feature of the object.

The second region determination module 502-4' may be configured to determine, in the other images of the image sequence, a second region corresponding to the same object part with the first region according to the movement information of the pixels in the other images of the image sequence.

Figure 8:
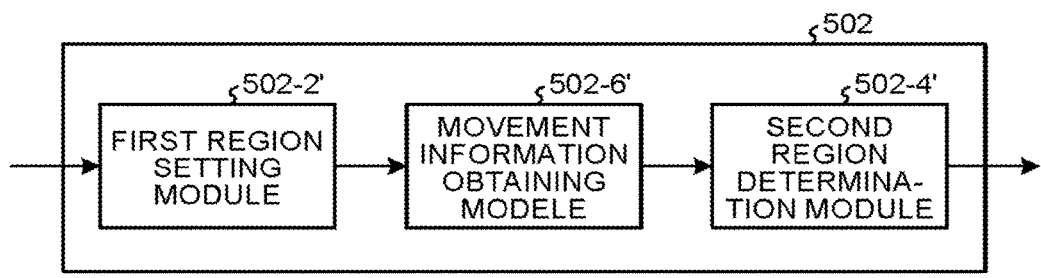
FIG. 8 is a block diagram showing still another example of the estimation unit of the medical image processing apparatus shown in FIG. 5.

FIG. 8 is a block diagram showing still another example of the estimation unit 502 of the medical image processing apparatus 500 shown in FIG. 5.

As shown in FIG. 8, the estimation unit 502 may include a first region setting module 502-2', a movement information obtaining module 502-6' and a second region determination module 502-4'.

The first region setting module 502-2' may be configured to set a first region on an image in an image sequence according to the feature of an object.

The movement information obtaining module 502-6' may be configured to carry out image registration for the other images and the image to obtain the movement information of the pixels in the other images.

The second region determination module 502-4' may be configured to determine, in the other images of the image sequence, a second region corresponding to the same object part with the first region according to the movement information of the pixels in the other images of the image sequence.

Figure 13:
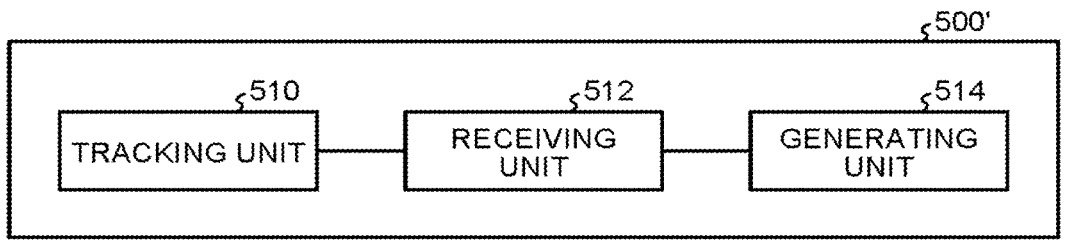
FIG. 13 is a block diagram showing a medical image processing apparatus according to another embodiment.

FIG. 13 is a block diagram showing a medical image processing apparatus according to another embodiment.

As shown in FIG. 13, a medical image processing apparatus 500' includes a tracking unit 510, receiving unit 512 and generating unit 514.

Figure 14:
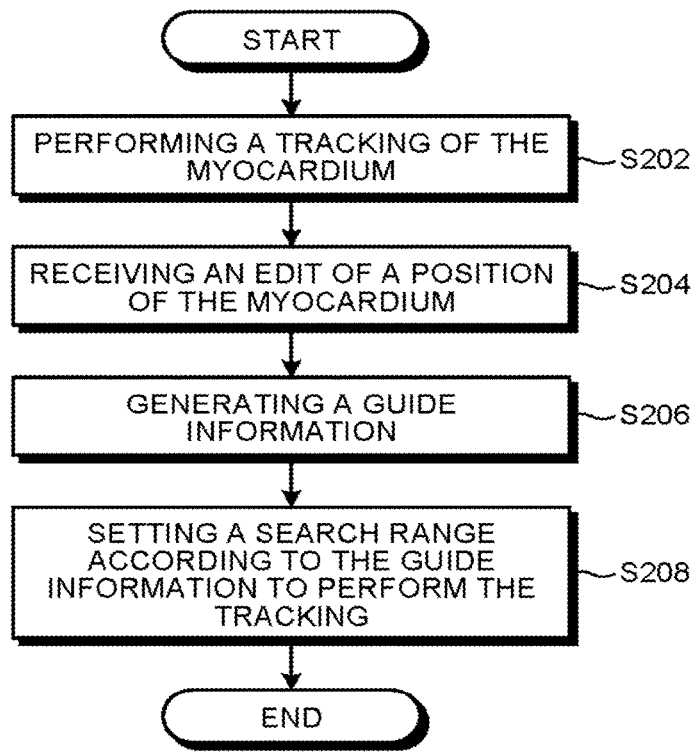
FIG. 14 is a flowchart showing an example of a medical image processing method by executed the medical image processing apparatus shown in FIG. 13.

FIG. 14 is a flowchart showing an example of a medical image processing method by executed the medical image processing apparatus 500' shown in FIG. 13. As shown in FIG. 14, in the step S202, the tracking unit 510 performs a tracking of the myocardium on the image group including the plurality of chronologically arranged images of a myocardium. For example, the tracking unit 510 performs a feature tracking on each of a plurality of images, containing the myocardium, which is chronologically arranged with respect to a feature of the myocardium to obtain the feature of the myocardium from each of the images. For example, the feature of the myocardium is a contour of the myocardium, as described below. However, the feature of the myocardium is not limited to an example of case that the feature is the contour.

Figure 15A:
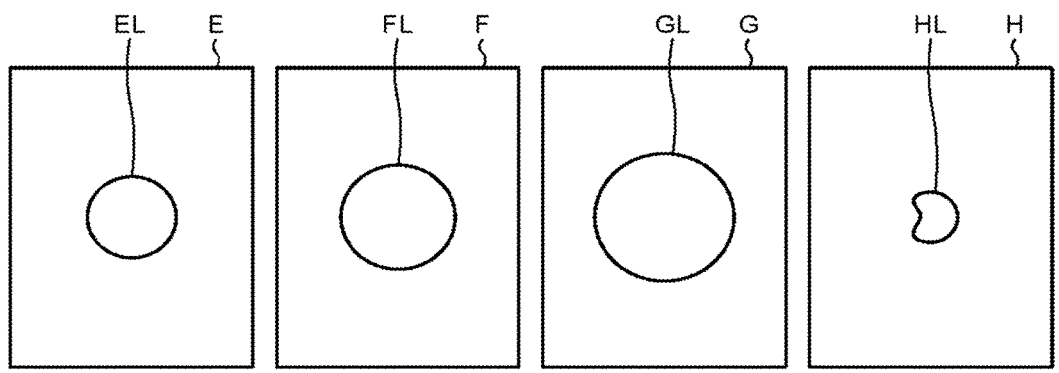
FIG. 15A is a diagram to explain an example of the processing by executed the medical image processing apparatus shown in FIG. 13.
Figure 15B:
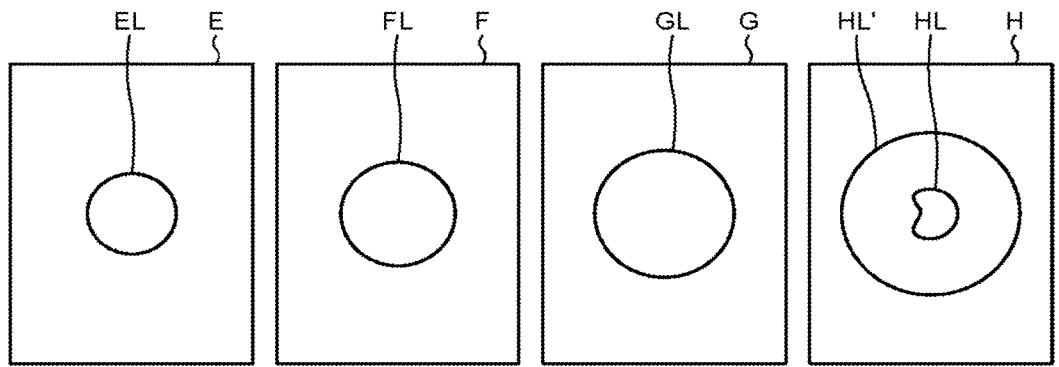
FIG. 15B is a diagram to explain an example of the processing by executed the medical image processing apparatus shown in FIG. 13.

FIG. 15A-15D are diagrams to explain an example of the processing by executed the medical image processing apparatus 500' shown in FIG. 13. As shown in FIG. 15A, in step 202, in the case that a contour EL as an initial contour is set on the image E by a user from a plurality of images E-H, containing the myocardium, which is chronologically arranged, the tracking unit 510 performs the contour tracking on each of the plurality of images F-H with respect to the contour EL to obtain contours FL-HL from the images F-H. Here, each of images E-H is at different time phase. An example of case that the time phase corresponding to the image E is "e," the time phase corresponding to the image F is "f," the time phase corresponding to the image G is "g" and the time phase corresponding to the image H is "h" is described below.

Then, in step S204, receiving unit 512 receives an edit of a position of the myocardium from the user which referred a result of the performed contour tracking. For example, receiving unit 512 receives an edit of the contour of the myocardium on the image corresponding to predetermined time phase in the plurality of images E-H. For example, as shown in FIG. 15A, receiving unit 512 causes a display part (not shown) to display the image E containing the contour EL and the images F-H containing the contours EL-HL obtained by performing the contour tracking. Here, an example of a case that the contour FL and the contour GL are accurate, but the contour HL obtained on the image H corresponding to the time phase h is inaccurate is described below. In this case, when the user selects the image H corresponding to the time phase h, and inputs an accurate contour on the selected image H by using input part (not shown, mouse or keyboard e.g.), receiving unit 512 receives an edit of the contour of the myocardium on the image H corresponding to the time phase h by the user and causes the display part to display the accurate contour HL' after editing.

Then, in step S206, the generating unit 514 generates a guide information according to a position of the myocardium before and after the editing. For example, the generating unit 514 generates a vector as the guide information for an image corresponding to predetermined time phase according to the positions of the contour of the myocardium before and after editing, wherein a position of an initial point of the vector is a position of the contour of the myocardium before editing, and a position of a terminal point of the vector is a position of the contour of the myocardium after editing. For example, as shown in FIG. 15G, the generating unit 514 generates vectors as guide information 5-1, 5-2 . . . , 5-N, wherein each of the initial point of the vectors as the guide information 5-1, 5-2 . . . 5-N is a point HL-1, HL-2 . . . , HL-N, and each of the terminal point of the vectors as the guide information 5-1, 5-2 . . . 5-N is a point HL'-1, HL'-2 . . . , HL'-N. Here, the point HL-1 on the contour HL is a first point on the contour HL, and the point HL-N on the contour HL is a Nth point on the contour HL. And, the point HL'-1 on the contour HL' is a first point on the contour HL', and the point HL'-N on the contour HL' is a Nth point on the contour HL'. That is, the generating unit 514 generates the vector as the guide information 5-$n$ (n=1, 2, . . . , N), wherein a position of an initial point of the vector is a position of a nth point on the contour HL, and a position of a terminal point is a position of a nth point on the contour HL'.

Figure 15D:
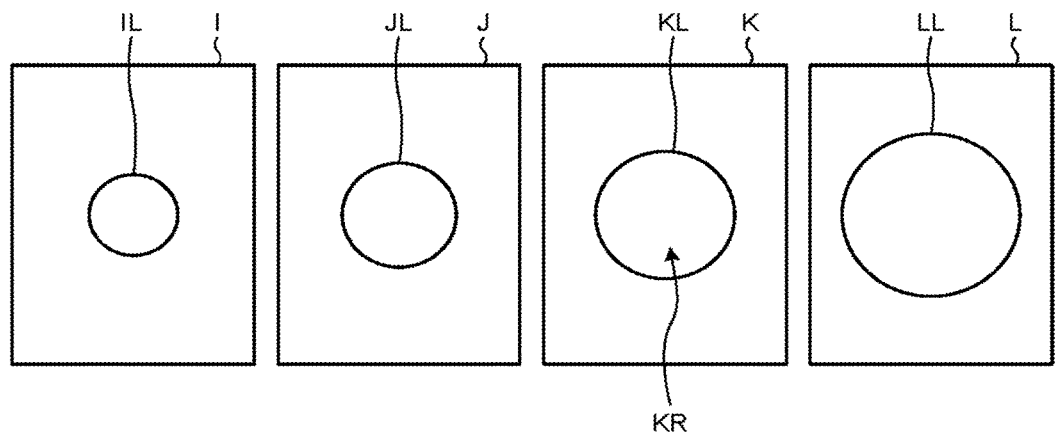
FIG. 15D is a diagram to explain an example of the processing by executed the medical image processing apparatus shown in FIG. 13.

Then, in step S208, the tracking unit 510 performs the tracking of the myocardium again. That is, as shown in FIG. 15D, in step S208, in the case that a contour IL as the initial contour is set on the image I by the user from a plurality of images I-L, containing the myocardium, which is chronologically arranged, the tracking unit 510 performs the contour tracking on each of the plurality of images J-L with respect to the contour IL to obtain contours JL-LL from the images J-L. Here, each of images I-L is at different time phase. An example of case that the time phase corresponding to the image I is "e," the time phase corresponding to the image J is "f," the time phase corresponding to the image K is "g" and the time phase corresponding to the image L is "h" is described below. Furthermore, the image I and the image E are at same time phase, the image J and the image F are at same time phase, the image K and the image G are at same time phase and the image L and the image H are at same time phase.

Here, in step S208, when the tracking unit 510 performs the tracking of the myocardium again, the tracking unit 510 sets a search range on the image corresponding to the predetermined time phase according to the guide information.

A specific example of the processing in step S208 is described below. For example, the tracking unit 510 divides a region KR defined by the contour KL into a plurality of parts (referred to as a fourth part) in the image K before one of the image L corresponding to time phase of the image H where the contour is edited. Then, the tracking unit 510 searches the point, in the contour KL, which is the nearest to the fourth part with respect to each fourth part. Then, the tracking unit 510 specifies the guide information corresponding to the point obtained as a result of the searching the point with respect to each fourth part. Then, the tracking unit 510 specifies, in the image K, a position where the fourth part is moved to quantity of movement and direction of movement that the guide information shows with respect to each specified guide information. Then, the tracking unit 510 specifies, in the image L, a part (referred to as a fifth part) corresponding to a position of each fifth part specified in the image K.

Furthermore, the tracking unit 510 sets the search range in the image L with the fifth part as the center with respect to each fifth part. The set search range may be, for example, a circle, an oval or a square which takes the fifth part as the center, as needed. The search range is used for the following template matching.

Sequentially, the tracking unit 510 searches a sixth part matching with the corresponding fourth part in the search range with respect to each search range which is set in the image L to perform image tracking.

By searching for the fifth part corresponding to the fourth part and setting the search range with the fifth part as the center, the sixth part matching with the fourth part can be determined more accurately and more quickly in the search range. Therefore, the tracking of the myocardium can be implemented accurately and quickly.

FIG. 9 is a block diagram exemplarily showing the configuration of a medical image device 900 according to an embodiment.

In order not to obscure the spirit and scope of the embodiment, other possible members of the medical image device 900 are saved in FIG. 9. The medical image device 900 may include the medical image processing apparatus 500. The medical image device 900 may be, but not limited to: an X-ray imaging diagnostic device, an ultrasound (UL) diagnostic imaging device, a computed tomography (CT) device, a magnetic resonance imaging (MRI) diagnostic device, a positron emission tomography (PET) device and the like.

The specific way or manner in which the medical image processing apparatus is arranged in a medical image device is well known by those skilled in the art and is therefore not described repeatedly here.

Although the basic principle of embodiments is described in conjunction with specific embodiments, it should be noted that it should be appreciated by those of ordinary skill in the art that all or any step or component of the method and the device of embodiments can be realized in any computing device (including processor, memory medium and so on) or a network of computing devices by hardware, software or combinations thereof which can be realized by those of ordinary skill in the art using basic programming skills with the understanding of the specification.

Thus, the object of embodiments can also be realized by running a program or a set of programs on an optional computing device. The computing device may be a well-known universal device. Therefore, the object of embodiments may also be realized merely by providing a program product containing program codes for realizing the method or device of embodiments. That is, such a program product also constitute embodiments, and a memory medium in which such a program product is stored also constitute embodiments. Apparently, the memory medium may be any well-known memory medium or any memory medium that may be developed in the future.

In the case where embodiments are achieved through software and/or firmware, a program constituting the software is installed on a computer having a dedicated hardware structure, for example, the universal computer 1000 shown in FIG. 10, from a memory medium or network, and the computer, when installed with various programs, is capable of realizing the functions of these programs.

In FIG. 10, a central processing unit (CPU) 1001 executes various processing via a program stored in a read-only memory (ROM) 1002 or a program loaded into a random access memory (RAM) 1003 from a memory part 1008. The data needed by the CPU 1001 to execute various processing may be stored in the RAM 1003, if needed. The CPU 1001, the ROM 1002 and the RAM 1003 are linked with each other via a bus line 1004 with which an input/output 1005 is also connected.

The following members are linked with the input/output interface 1005: an input part 1006 (including keyboard, mouse and the like), an output part 1007 (including displays such as cathode ray tube (CRT), liquid crystal display (LCD) and loudspeaker), a memory part 1008 (including hard disc and the like) and a communication part 1009 (including network interface card such as LAN card and modem). The communication part 1009 implements a communication processing via a network such as the Internet. A driver 1010 may also be connected with the input/output interface 1005, if needed. If needed, a removable medium 1011, for example, a magnetic disc, an optical disc, a magnetic optical disc, a semiconductor memory and the like, may be installed in the driver 1010 to read a computer program therefrom and install the read computer program in the memory part 1008.

In the case where the foregoing series of processing is achieved through software, programs forming the software are installed from a network such as the Internet or a memory medium such as the removable medium 1011.

It should be appreciated by those skilled in the art that the memory medium is not limited to the removable medium 1011 shown in FIG. 10 in which programs are stored and which is distributed separated from the device so as to provide the programs for users. Examples of the removable medium 1011 include a magnetic disc (including floppy disc (registered trademark)), a compact disc (including compact disc read-only memory (CD-ROM), a digital video disk (DVD)), a magnetic optical disc (including mini disc (MD) (registered trademark)) and a semiconductor memory. Alternatively, the memory medium may be the hard discs included in the ROM 1002 and the memory part 1008, and programs are stored in the memory medium and distributed to the users along with the memory medium.

Embodiments further provide a program product in which machine-readable instruction codes are stored. The aforementioned method can be implemented when the instruction codes are read and executed by a machine.

Accordingly, a memory medium for storing the program product in which computer-readable instruction codes are stored is also included in embodiments. The memory medium includes but is not limited to a floppy disc, an optical disc, a magnetic optical disc, a memory card, a memory stick and the like.

It should be appreciated by those of ordinary skill in the art that the examples are exemplary and embodiments are not limited to these examples.

The 'first', 'second' and 'Nth', as used herein, are used to literally distinguish the described features to describe embodiments clearly. Therefore, the 'first', 'second' and 'Nth' are not to be construed as having any limiting meaning.

As an example, each step of the foregoing method and each module and/or unit of the device may be implemented as software, firmware, hardware or a combination thereof and serve as a part of a corresponding device. Each module and each unit in the foregoing device can be configured as software, firmware hardware or a combination thereof in a specific means or manner that is well known to those of ordinary skill in the art and is therefore not described here repeatedly.

As an example, in the case where the steps or modules and/or units are achieved through software or firmware, a program constituting the software or the firmware may be installed on a computer having a dedicated hardware structure (e.g. the universal computer 1000 shown in FIG. 10) from a memory medium or network, and the computer, when installed with various programs, is capable of realizing the functions of these programs.

In the foregoing description of specific embodiments, the features described and/or shown for an implementation mode may be used in one or more other implementation modes in the same or like way or combined with the those of the other implementation modes or replace those of the other implementation modes.

It should be emphasized that the term 'include/comprise', as used herein, refers to the presence of a feature, an element, a step or a component, but does not preclude the presence or addition of one or more other features, elements, steps or components.

Furthermore, the method of embodiments may be implemented sequentially, synchronously or independently according to another time sequence, but not limited to be implemented according to the time sequence described herein. Therefore, the implementation order of the method described herein is not to be construed as limiting the technical scope of embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
    tracking circuitry configured to perform tracking of a myocardium in a plurality of images containing the myocardium, the images being chronologically arranged;
    receiving circuitry configured to receive an edit of a first position of the myocardium, from a user referring to a result of the tracking performed by the tracking circuitry; and
    generating circuitry configured to generate, as guide information, a vector that indicates a difference between the first position of the myocardium before the editing and a second position of the myocardium after the editing, wherein the tracking circuitry is further configured to set a search range for the tracking, according to the generated guide information, to perform the tracking again.

2. The medical image processing apparatus of claim 1, wherein the generating circuitry is further configured to generate vectors as the guide information.

3. A medical image processing method, comprising:
    performing tracking of a myocardium in a plurality of images containing the myocardium, the images being chronologically arranged;

receiving an edit of a first position of the myocardium, from a user referring to a result of the performed tracking;

generating, as guide information, a vector that indicates a difference between the first position of the myocardium before the editing and a second position of the myocardium after the editing; and setting a search range for the tracking, according to the generated guide information, to perform the tracking again.

4. A medical image device comprising a medical image processing apparatus, the medical image processing apparatus comprising:

tracking circuitry configured to perform a tracking of a myocardium in a plurality of images containing the myocardium, the images being chronologically arranged;

receiving circuitry configured to receive an edit of a first position of the myocardium, from a user referring to a result of the tracking performed by the tracking circuitry; and generating circuitry configured to generate as guide information, a vector that indicates a difference between the first position of the myocardium before the editing and a second position of the myocardium after the editing, wherein the tracking circuitry is further configured to set a search range for the tracking according to the generated guide information, to perform the tracking again.

5. The medical image device according to claim 4, wherein the medical image device comprises an X-ray imaging diagnostic device, an ultrasound diagnostic imaging device, a computed tomography device, a magnetic resonance imaging diagnostic device or a positron emission tomography device.

* * * * *